Sept. 24, 1963   H. P. HENRY   3,104,894
COUPLERS FOR CONNECTING TRAILERS TO TOWING VEHICLES
Filed June 19, 1961   3 Sheets-Sheet 2

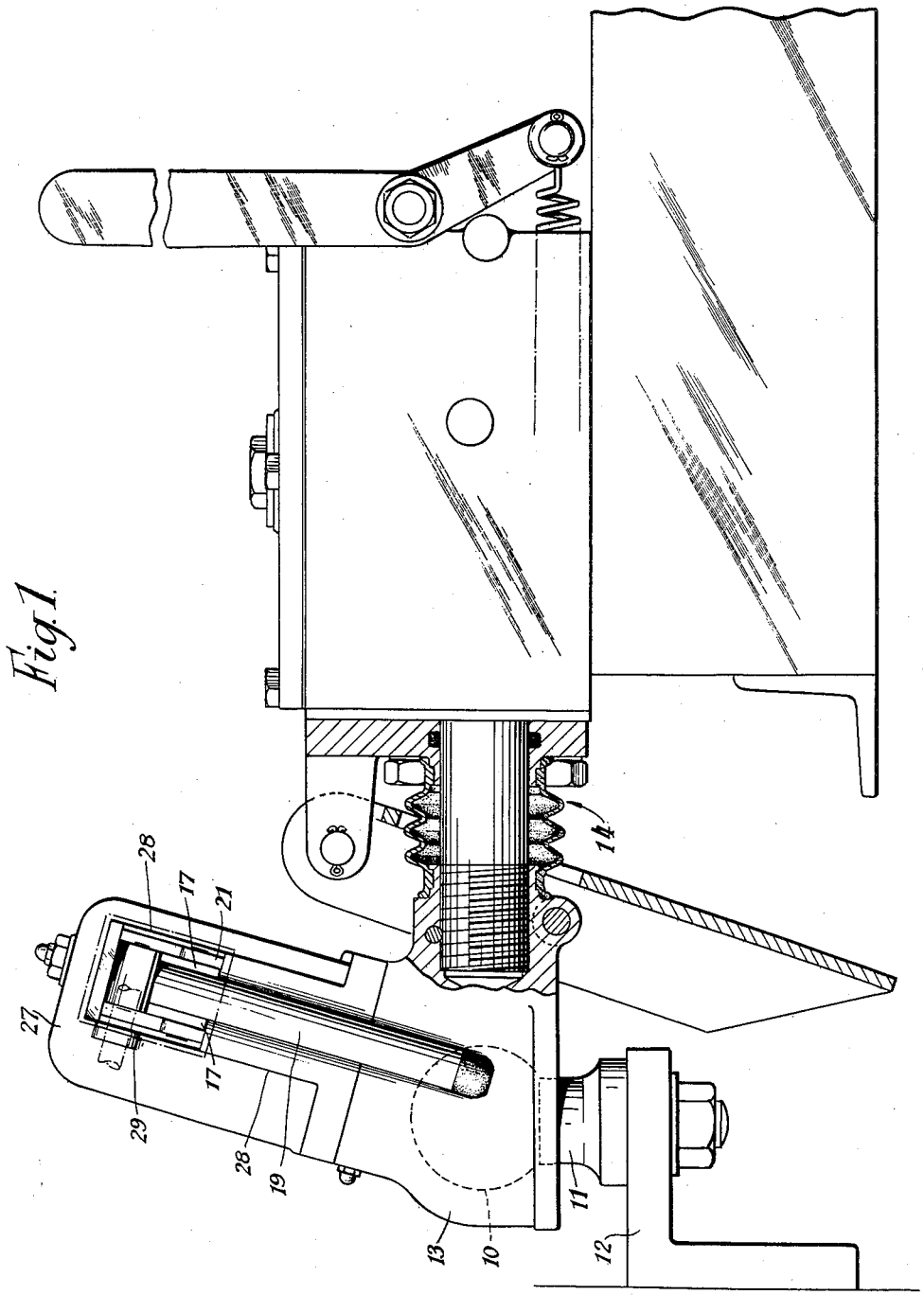

INVENTOR
HOWARTH PADGETT HENRY
BY William R. Lieberman
ATTORNEY

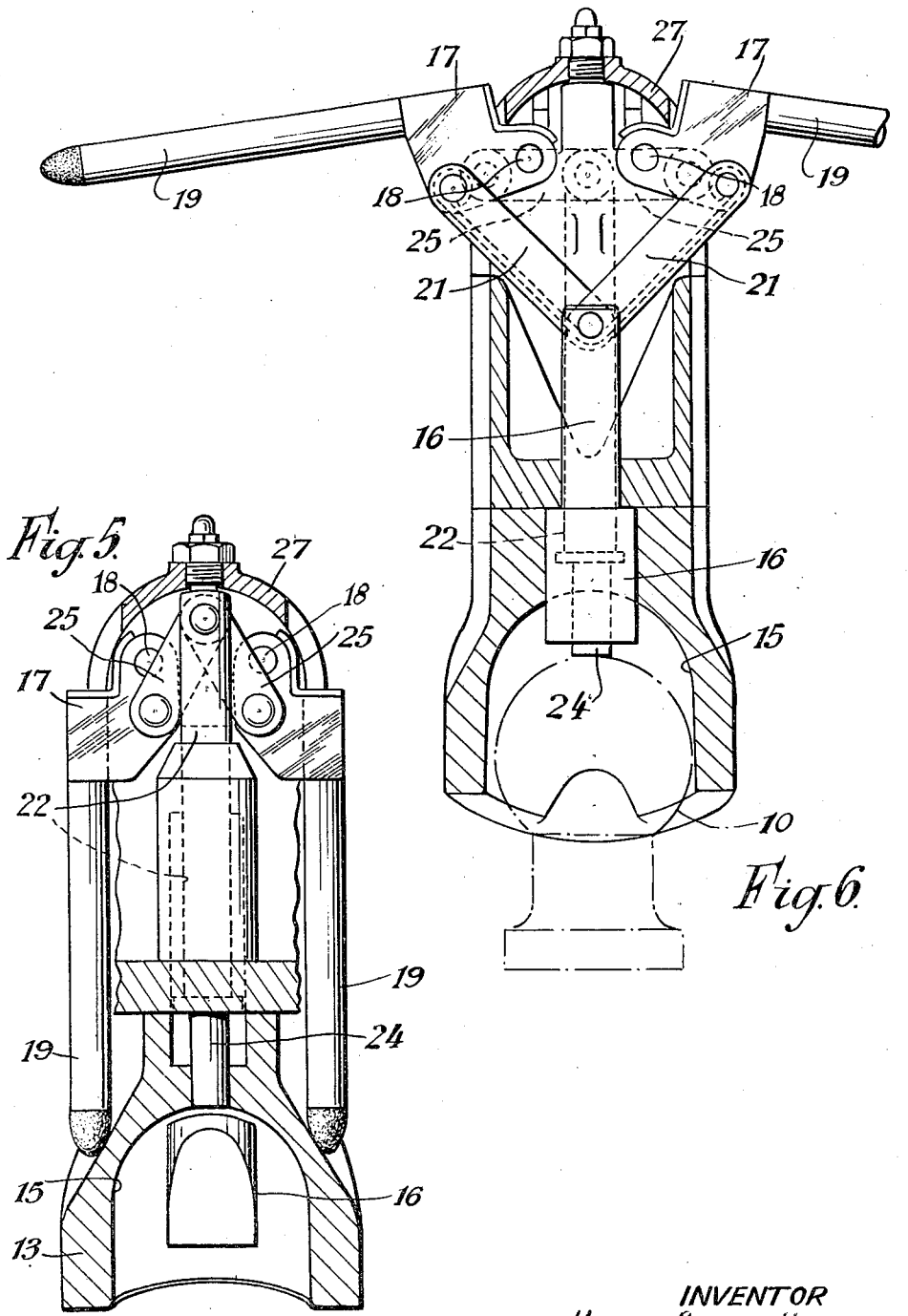

United States Patent Office 3,104,894
Patented Sept. 24, 1963

3,104,894
COUPLERS FOR CONNECTING TRAILERS TO TOWING VEHICLES
Howarth Padgett Henry, 140 W. 42nd St., New York, N.Y.
Filed June 19, 1961, Ser. No. 126,410
Claims priority, application Great Britain Aug. 10, 1960
11 Claims. (Cl. 280—513)

This invention relates to couplers for connecting trailers to towing vehicles, and more particularly to couplers for that purpose including a ball mounted on one of the vehicles, usually the towing vehicle, adapted to engage in a socket on the other vehicle and to be retained in the socket by a sliding bolt.

The object of the present invention is to provide a coupler in which the sliding bolt can be moved to the engaged position only if the ball is properly engaged in the socket, and in which it can be readily seen from the exterior of the coupler whether or not the bolt is engaged.

According to the invention, the sliding bolt is retained in its inoperative position by a toggle locking device released by insertion of the ball into the socket, and is retained in its engaged position by a second toggle locking device, manual operating means for the said sliding bolt comprising external levers acting on the said sliding bolt through the second toggle locking device and held against movement to engage the sliding bolt by the first toggle locking device.

Figure 3:
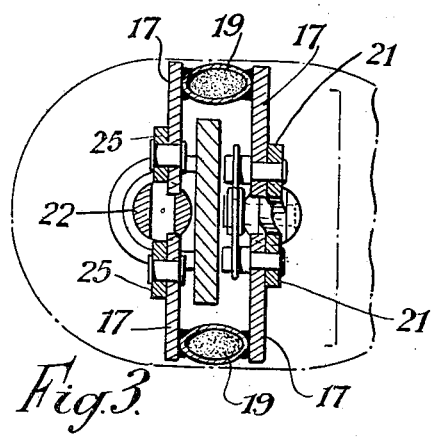
Figure 4:
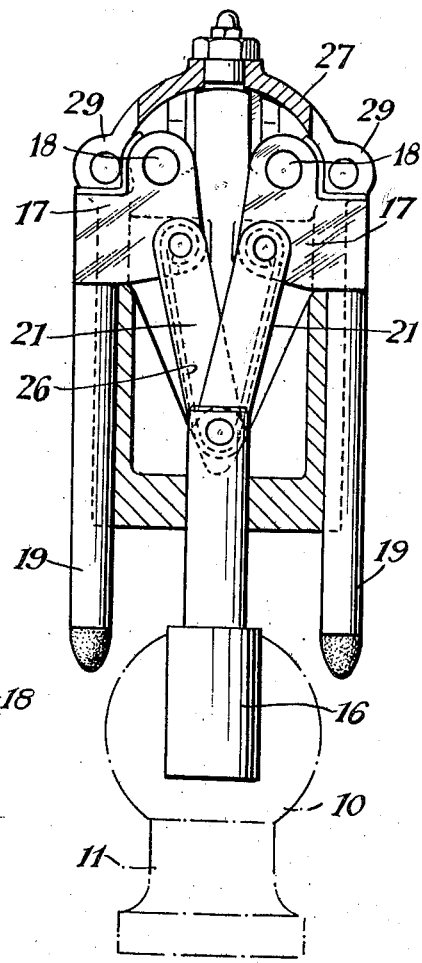
Figure 2:
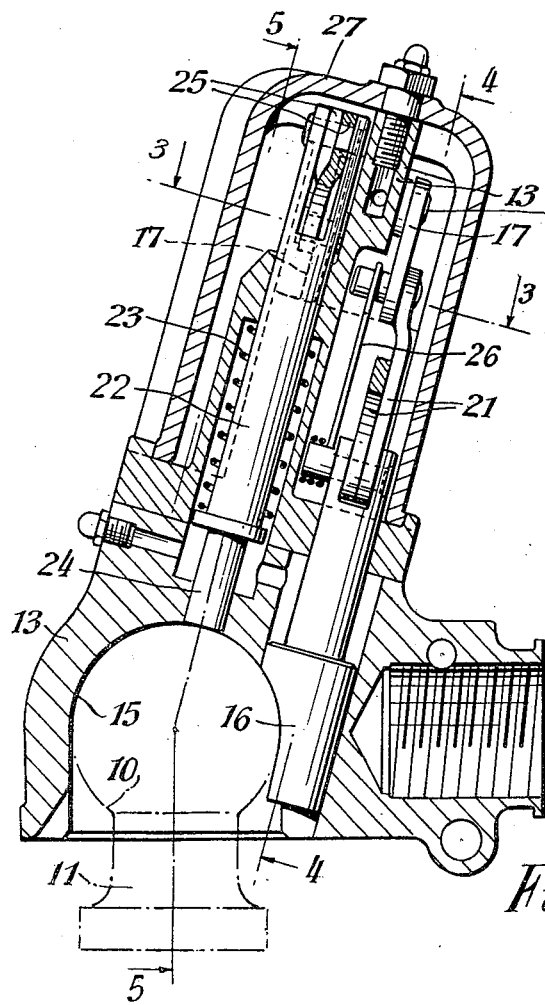

One embodiment of the invention is hereinafter described by way of example with reference to the accompanying drawings in which:

FIGURE 1 is a side elevation of the coupler;
FIGURE 2 is a longitudinal section through the coupler;
FIGURE 3 is a sectional plan on the line 3—3 of FIGURE 2;
FIGURE 4 is a transverse section on the line 4—4 of FIGURE 2;
FIGURE 5 is a transverse section on the line 5—5 of FIGURE 2; and
FIGURE 6 is a section similar to FIGURE 4 showing the parts in another position.

Referring to FIGURES 1 and 2, the coupler comprises a ball 10 having an integral neck 11 by means of which it is secured to a suitable bracket 12 on a towing vehicle, the neck extending upwardly from the bracket 12. A socket member 13 is mounted on a drawbar 14 secured to a trailer vehicle, the socket 15 therein (FIGURES 2, 5 and 6) opening downwardly so that it can receive the ball 10. The upper end of the socket 15 in the socket member 13 is substantially hemispherical, and a sliding bolt 16 is mounted in the socket member, at an angle to the axes of the socket as shown in FIGURE 2, so that, when moved downwardly to its operative position, it engages under the curve of the ball 10 and retains the latter in the socket 15.

A pair of levers 17, 17 each comprising a pair of flat metal cheeks as shown in FIGURE 3 are pivoted at 18, 18 on the socket member 13 two handles 19, 19 being welded each between the cheeks constituting one lever. The levers 17, 17 are coupled by links 21, 21 (FIGURE 4) to the sliding bolt 16 so that movement of the levers about their pivots raises or lowers the bolt. A tappet 22, slidable in the socket member 13 and urged by a spring 23 in a direction such that its end 24 projects into the top of the socket 15, is also coupled by a pair of links 25, 25 to the levers 17, 17 as shown in FIGURE 5. The links 21, 21 and the links 25, 25 are so arranged that, as the handles 19, 19 are moved to disengage the sliding bolt 16, the tappet 22 moves into the socket, and vice-versa.

When the sliding bolt is fully engaged, the pivot of each link 21 to the associated lever 17 is in a straight line with or has moved slightly past the pivot axis of the lever and the pivot at the other end of the link, being urged towards this position by a spring 26, so that the sliding bolt is locked, by toggle action of the levers and links, in the engaged position. When the sliding bolt is fully released, the links 25, 25 are in alignment one with the other or have moved slightly past the alignment position so that the levers 17, 17 are locked by toggle action of the said links and cannot be operated to move the sliding bolt to the engaged position until the tappet 22 is moved to displace them from their aligned position.

FIGURES 4 and 5 show the links 21, 21 and the links 25, 25 respectively in the positions they occupy when the sliding bolt 16 is engaged, and FIGURE 6 shows both sets of links, and the handles 19, 19 in the positions they occupy when the sliding bolt 16 is disengaged, the links 25, 25 being shown in dotted lines.

A cover 27 (FIGURE 1) is provided to enclose the mechanism, the cover 27 being slotted at 28 to receive the handles 19, 19 and being formed with apertured lugs 29, 29 through which the bail of a padlock may be passed to hold the levers 17, 17 against movement to release the sliding bolt. The handles 19, 19, when the sliding bolt 16 is disengaged, project laterally from the socket member and provide a clear indication that the sliding bolt is disengaged. Covers of flexible material such as rubber may be mounted on the handles to close the openings in the cover through which the handles extend, when the sliding bolt is engaged, these covers being shown in chain-dotted lines in FIGURE 1.

It will be apparent that, to engage the coupler, the socket member, with the sliding bolt retracted, is lowered on to the ball 10, the tappet 22 being pushed back as the ball enters the socket 15 to release the links 25, 25 and allow the sliding bolt to be engaged.

To release the coupler, the handles 19, 19 are moved outwardly and upwardly from the positions shown in FIGURE 4 to the positions shown in FIGURE 6, thus lifting the sliding bolt and projecting the tappet 22 into the socket 15, the final movement of the tappet 22 being assisted by the spring 23 when the links 25, 25 approach their aligned position.

I claim:
1. A coupler for connecting a trailer vehicle to a towing vehicle comprising a coupling ball mounted on one of said vehicles and a socket member mounted on the other of said vehicles, said socket member including a body member having a socket formed therein adapted to engage said coupling ball, a latch member mounted on said body member and movable relative to said socket between an advanced ball lock position and a retracted ball release position, a first toggle linkage connected between said latch member and said body member and movable between a first releasably locked position maintaining said latch member in advanced position and a second position maintaining said latch member in retracted position, said first toggle linkage including a pair of first and second links connected at their inner ends to define an elbow and said first links being hinged at a first point spaced from said elbow to said body member and said second link being hinged at a second point spaced from said elbow to said latch member, said first hinge point, said elbow and said second hinge point being in alignment when said latch member is in advanced position, and said hinge points moving toward each other and said elbow moving in a direction away from alignment therewith with the movement of said latch member toward said retracted position, and means releasably locking said first toggle linkage in said second position.

2. The coupler of claim 1, including spring means normally urging said first toggle linkage toward said first position.

3. The coupler of claim 1 including a hand lever coupled to and movable with said first toggle linkage and adapted to move said first toggle linkage from its said first position to its said second position.

4. A coupler for connecting a trailer vehicle to a towing vehicle comprising a coupling ball mounted on one of said vehicles and a socket member mounted on the other of said vehicles, said socket member including a body member having a socket formed therein adapted to engage said coupling ball, a longitudinally axially slidable bolt mounted to said body member and movable relative to said socket between an advanced ball lock position and a retracted ball release position, a pair of transversely spaced levers pivoted to said body member and swingable about axes on opposite sides of said longitudinal axis of said bolt, a first pair of toggle links pivoted to said bolt and to respective of said levers at first pivot points spaced from said lever swing axes to define with said levers a first toggle linkage, a longitudinally slidable tappet member projecting into said socket, and a second pair of toggle links pivoted to said tappet and to respective of said levers at pivot points spaced from said lever swing axes to define with said levers a second toggle linkage.

5. The coupler of claim 4 including hand manipulatable members disposed external of said body member and connected to said levers.

6. The coupler of claim 4 wherein the pivot points of corresponding of said levers and first toggle links are substantially aligned when said bolt is in its advanced position to define a releasably locked position of said first toggle linkage.

7. The coupler of claim 4 wherein the pivot points of said second toggle links are substantially aligned when said bolt is in its retracted position.

8. The coupler of claim 4 including spring means normally urging said tappet forwardly into said socket and said second toggle links to their aligned positions.

9. The coupler of claim 6 including spring means normally urging said first toggle linkage toward its locked position.

10. A coupler for connecting a trailer vehicle to a towing vehicle comprising a coupling ball mounted on one of said vehicles and a socket member mounted on the other of said vehicles, said socket member including a body member having a socket formed therein adapted to engage said coupling ball, a latch member mounted on said body member and movable relative to said socket between an advanced ball lock position and a retracted ball release position, a toggle linkage connected between said latch member and said body member and movable between a first releasably locked position maintaining said latch member in advanced position and a second position maintaining said latch member in retracted position, and means releasably locking said toggle linkage in said second position, and including trigger means responsive to the engagement of said ball by said socket to release said toggle locking means.

11. A coupler for connecting a trailer vehicle to a towing vehicle comprising a coupling ball mounted on one of said vehicles and a socket member mounted on the other of said vehicles, said socket member including a body member having a socket formed therein adapted to engage said coupling ball, a latch member mounted on said body member and movable relative to said socket between an advanced ball lock position and a retracted ball release position, a first toggle linkage connected between said latch member and said body member and movable between a first releasably locked position maintaining said latch member in advanced position and a second position maintaining said latch member in retracted position, and means releasably locking said first toggle linkage in said second position and including a second toggle linkage connected to and movable with said first toggle linkage and movable to a releasably locked position when said first toggle linkage is in its said second position.

References Cited in the file of this patent
UNITED STATES PATENTS 2,166,208    Dayton _____ July 18, 1939

FOREIGN PATENTS 260,697    Great Britain _____ Nov. 11, 1926